(12) United States Patent
Shi

(10) Patent No.: US 9,591,106 B2
(45) Date of Patent: Mar. 7, 2017

(54) ROBUST HEADER COMPRESSION PROCESSING METHOD AND ROBUST HEADER COMPRESSION PROCESSOR

(75) Inventor: Xuehong Shi, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 375 days.

(21) Appl. No.: 14/238,506

(22) PCT Filed: Apr. 19, 2012

(86) PCT No.: PCT/CN2012/074358
§ 371 (c)(1),
(2), (4) Date: Feb. 13, 2014

(87) PCT Pub. No.: WO2013/023458
PCT Pub. Date: Feb. 21, 2013

(65) Prior Publication Data
US 2014/0198809 A1    Jul. 17, 2014

(30) Foreign Application Priority Data

Aug. 12, 2011  (CN) .......................... 2011 1 0230989

(51) Int. Cl.
*H04J 3/18* (2006.01)
*H04L 29/06* (2006.01)
*H04W 28/06* (2009.01)

(52) U.S. Cl.
CPC .............. *H04L 69/22* (2013.01); *H04L 69/04* (2013.01); *H04L 69/16* (2013.01); *H04W 28/06* (2013.01)

(58) Field of Classification Search
None
See application file for complete search history.

(56) References Cited

U.S. PATENT DOCUMENTS

| 2002/0021704 A1* | 2/2002 | Tsuchiya | H04L 12/66 370/401 |
| 2002/0131450 A1* | 9/2002 | Yoshida | H04J 3/1617 370/474 |
| 2002/0191691 A1* | 12/2002 | Holborow | H04L 29/06 375/240 |

FOREIGN PATENT DOCUMENTS

| CN | 1507286 A | 6/2004 |
| CN | 1595911 A | 3/2005 |

(Continued)

OTHER PUBLICATIONS

C. Bormann, Jul. 2001, RObust Header Compression (ROHC): Framework and four profiles: RTP, UDP, ESP, and uncompressed; https://tools.ietf.org/html/rfc3095.*

(Continued)

*Primary Examiner* — Kwang B Yao
*Assistant Examiner* — Hardikkumar Patel
(74) *Attorney, Agent, or Firm* — Ling Wu; Stephen Yang; Ling and Yang Intellectual Property

(57) ABSTRACT

A robust header compression processing method and a robust header compressor are disclosed. The method includes: a compressor processing a plurality of data packets at the front of a packet flow by using an Internet Protocol (IP) identifier random behavior pattern, and determining an IP identifier behavior pattern according to characteristics of IP identifiers in the plurality of data packets at the front; and the compressor processing subsequent data packets of the packet flow according to the determined IP identifier behavior pattern. With the robust header compression processing method and the robust header compressor, waste of wireless resources can be avoided, and a utilization rate of the wireless resources can be enhanced.

8 Claims, 8 Drawing Sheets

| Version | Header length | Service type | Datagram length | |
|---|---|---|---|---|
| IP identifier | | | Fragment identifier | Fragment offset value |
| Time to live | | Protocol | Checksum | |
| Source address | | | | |
| Destination address | | | | |
| IP option (filled when required) | | | | |

(56) References Cited

FOREIGN PATENT DOCUMENTS

| | | |
|---|---|---|
| CN | 101179564 A | 5/2008 |
| CN | 101204068 A | 6/2008 |
| CN | 101594290 A | 12/2009 |
| CN | 102291406 A | 12/2011 |
| WO | 2004057829 A1 | 7/2004 |

OTHER PUBLICATIONS

G. Pelletier, Apr. 2005, Ericsson AB, Robust Header Compression (ROHC): Profiles for User data gram protocol (UDP) Lite; https://tools.ietf.Org/html/rfc4019#section-3.2.3.*
RObust Header Compression (ROHC): A Compression profile for IP, Network Working Group, L-E. Jonsson et al. Jun. 2004.
RObust Header Compression (ROHC): Framework and four profiles: RTP, UDP, ESP, and uncompressed, Network Working Group, C. Borman, Editor, TZI/ Uni Bremen et al. , Jul. 2001.
RE:[rohc] Linux constant IP ID field can't be compressed in profile 0x0001?, Liu Zhigang, May 30, 2003, XP055167262.
International Search Report for PCT/CN2012/074358 dated Jul. 5, 2012.

\* cited by examiner

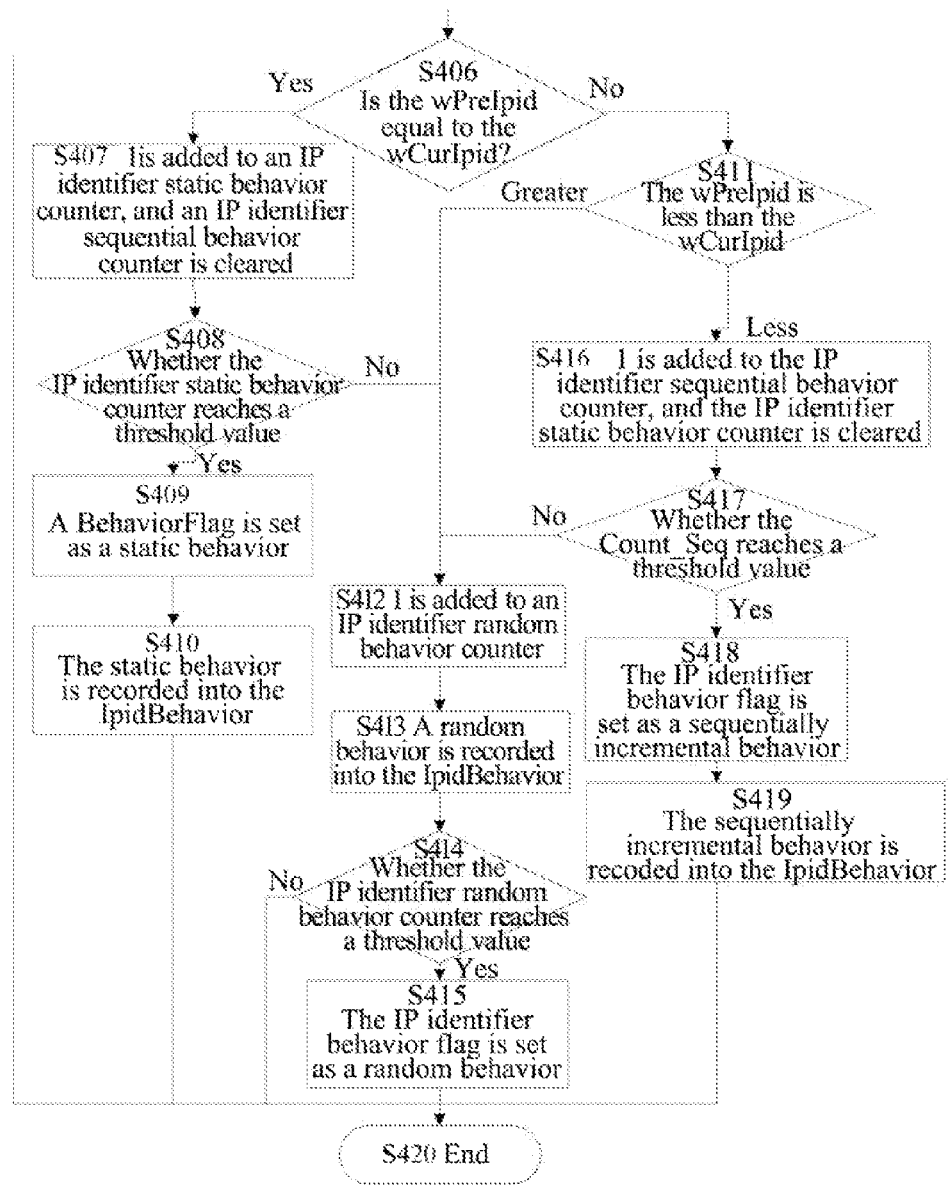
FIG. 4 (continue)

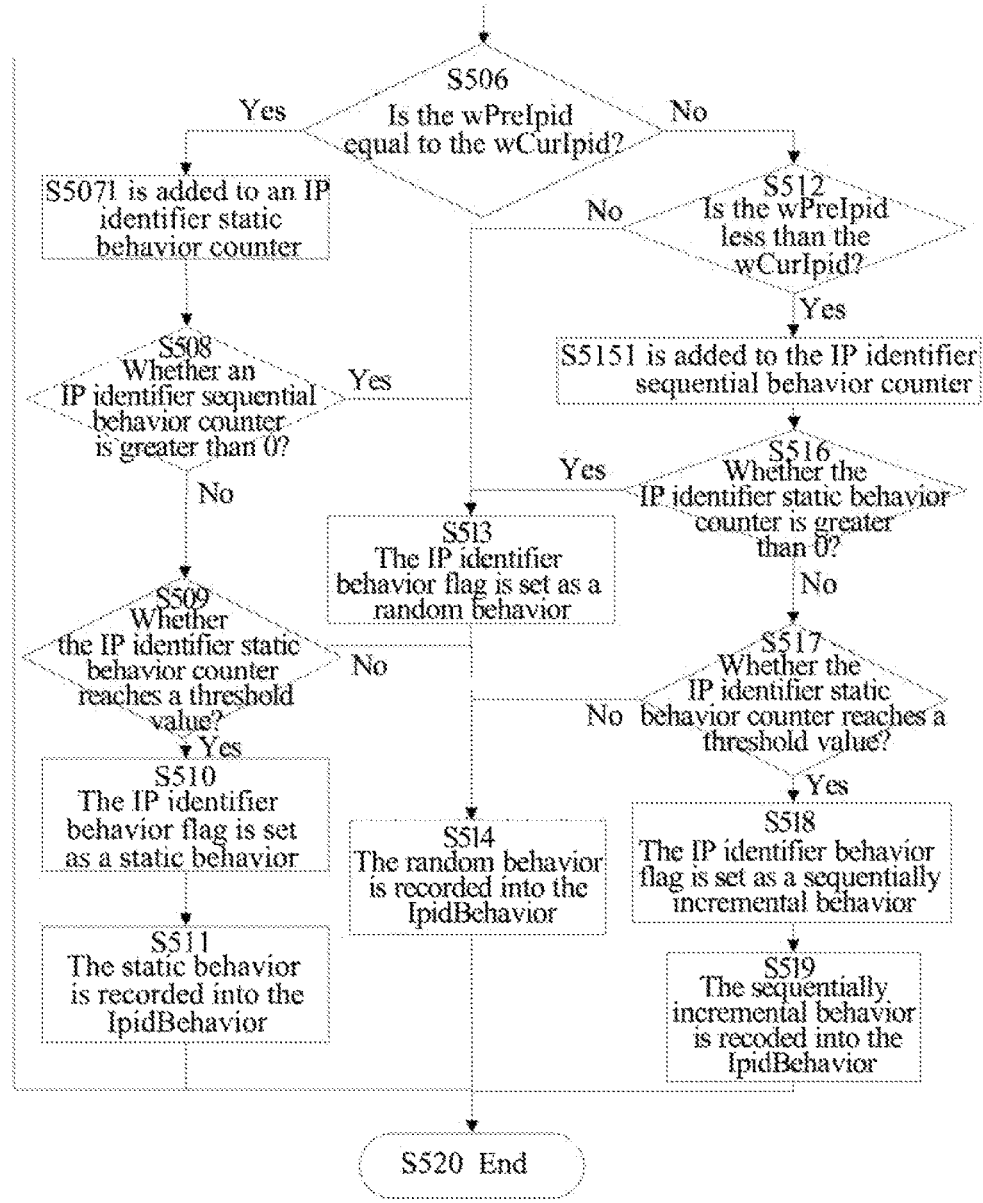
FIG. 5 (continue)

ROBUST HEADER COMPRESSION PROCESSING METHOD AND ROBUST HEADER COMPRESSION PROCESSOR

TECHNICAL FIELD

The present document relates to the field of mobile communication, and especially, to a robust header compression processing method and a robust header compression algorithm in a robust header compression processor.

BACKGROUND OF THE RELATED ART

Due to the limitation of physical conditions, when compared with wired links, wireless links in a mobile communication system have a lower transmission rate and a higher bit error rate. In order to make effective use of the limited wireless channel bandwidth resources, the Robust Header Compress (ROHC) technology is introduced. The core of ROHC is to use the information redundancy between packets of service flow to transparently compress and decompress information in packet headers between directly connected nodes. The ROHC technology is described by the RHC3095 document of Internet Engineering Task Force (IETF). But compression and decompression of an Internet Protocol (IP) header is not defined in the document, thus, in June, 2004, the ROHC working group has to separately define a framework for compression and decompression of the IP header in RFC 3843, and in February, 2007, the IETF revised the related documents of the ROHC, and the revised document is RHC 4815.

An Internet Protocol Identifier (IPID) is a field in an IP version 4 (IPV4), and each IP packet will carry the IPID, which is mainly used for fragmentation and recombination for IP packets. The position of a specific IP Identifier field in the IPV4 header is as shown in FIG. 1. In the network transmission process of an IP packet, if the size of the IP packet exceeds a Maximum Transmission Unit (MTU) of links at the bottom layer, the IP packet must be fragmented when it is allowed to fragment the IP packet, and when fragmentation data come to the next network node, it is determined whether these fragmentations belong to the same IP packet through the IPID of the IP header and the fragmentations are assembled to restore the original IP data.

The IPID is allocated by a generator of the IP packet according to certain strategies; the strategies which may be used will adopt allocation ways such as random allocation, sequential increment, and static constant and so on. If the generator of the IP packet adopts the random distribution way, the IPIDs of these IP packets follow no rules and they are rambling; if the generator of the IP packet adopts the allocation way of sequential increment, an IPID value in an IP packet generated latter will be increased compared with the former IP packer; if the generator of the IP packet adopts the allocation way of static constant, IPID field values in all IP packets generated by the generator are the same. The ways of random allocation and sequential increment are more common, while the allocation way of static constant is generally used in a Network Address Translation (NAT) environment, or when it is known that a Don't Fragment (DE) field in the IP header is 1 in a User Datagram Protocol (UDP) or a UDP-Lite, the IPID is set as a constant.

Because of such characteristics of IPID, the IPID can be compressed and decompressed by using certain algorithms in the ROHC, avoiding the transmission of an original value of the IPID in the wireless links as far as possible. For the ROHC, different allocations ways of the IPID correspond to different behaviors of the IPID, the random allocation way corresponds to random behaviors of the IPID, the sequential increment way corresponds to sequential behaviors of the IPID, and the static constant way corresponds to static behaviors of the IPID. When the behavior of the IPID is random, an original value of the IPID has to be carried in each package; when the behavior of the IPID is sequential, an IPID Offset coding scheme can be used to encode the IPID, and then the coded value is sent to an opposite end; when the behavior of the IPID is static, the original value only needs to be sent once at the beginning, and the related information of the IPID is not required to be sent in the package subsequently.

In the RFC 3095 protocol, an IPID Offset coding method is defined. With regard to IPIDs in an ascending order, a difference between the IPID and a Sequence Number (SN) is obtained, then the difference is coded through Window-based Least Significant Bits (WLSB) and then sent to the opposite end, after a decompressor of the opposite end receives the difference, the decompressor firstly performs Least Significant Bits (LSB) decompression to obtain the difference between the IPID and the SN, and eventually restores the original value of the IPID in combination with a restored value of the SN.

In the RFC 3843, a compression method for static IPIDs is defined, wherein, a compressor informs the decompressor of a situation that the IPID is static by adding related identifiers in initial refresh message, and sends the original IPID value to the decompressor, thus, the subsequent packages are not required to carry any information of the IPID, and the decompressor also can restore the original value of the IPID. When the IPID is allocated by the static constant way, the IPID Offset method cannot be used for encoding.

In the protocols of the ROHC, with respect to the behaviors of the IPID, the RFC 3095 gives an assumption that IPIDs in a wireless cellular network must be generally in an ascending order. With the increase of ROHC application scenarios and the progressive development of the protocols, this assumption is obviously out of date. Throughout the related protocols of the ROHC, only how to perform related compression and decompression according to the difference between the behaviors of the IPID is described, but no method for recognizing the behaviors of the IPID is provided. When the specific behaviors of the IPID are not known, it can be only believed that the behaviors of the IPID are random, so only the original IPID value can be sent each time, thereby wasting wireless resources and reducing the efficiency of compression and decompression.

SUMMARY OF THE INVENTION

The technical problem required to be solved by the present document is to provide a robust header compression processing method and a robust header compressor, to solve the problem of waste of wireless resources.

In order to solve the above technical problem, the following technical scheme is adopted in the present document:

A robust header compression processing method comprises:

a compressor processing a plurality of data packets at the front of a packet flow by using an Internet Protocol (IP) identifier random behavior pattern, and determining an IP identifier behavior pattern according to characteristics of IP identifiers in the plurality of data packets at the front; and the compressor processing subsequent data packets of the packet flow according to the determined IP identifier behavior pattern.

Alternatively, the step of a compressor determining an IP identifier behavior pattern according to characteristics of IP identifiers in the plurality of data packets at the front comprises:

if the IP identifiers in the data packets increase continuously, and a number of data packets with continuously increasing times reaches a first threshold value, determining as an IP identifier incremental behavior pattern; and if the IP identifiers in the data packets keep static continuously, and a number of data packets keeping static continuously reaches a second threshold value, determining as an IP identifier static behavior pattern; and otherwise, determining as an IP identifier random behavior pattern.

Alternatively, the step of a compressor determining an IP identifier behavior pattern according to characteristics of IP identifiers in the plurality of data packets at the front comprises:

before the IP identifier behavior pattern is determined, executing the following steps with respect to each data packet:

(a) judging whether a packet flow of data packets to be compressed has already existed;

(b) if the packet flow of the data packets does not exist, initializing a first counter, a second counter and a third counter, and adding 1 to the third counter; and if the packet flow of the data packets exists, executing step (c);

(c) judging a relationship between a first IP identifier in a current data packet and a second IP identifier in a previous data packet; if the first IP identifier is greater than the second IP identifier, adding 1 to the first counter, clearing the second counter, and proceeding to step (d); if the first IP identifier is equal to the second IP identifier, adding 1 to the second counter, clearing the first counter, and proceeding to step (e); and otherwise, executing step (f);

(d) judging whether the first counter reaches the first threshold value, if the first counter reaches the first threshold value, determining as an incremental behavior pattern; and if the first counter does not reach the first threshold value, executing step (f);

(e) judging whether the second counter reaches the second threshold value, if the second counter reaches the second threshold value, determining as a static behavior pattern; and if the second counter does not reach the second threshold value, executing step (f); and (f) adding 1 to the third counter, and judging whether the third counter reaches the third threshold, if the third counter reaches the third threshold, determining as a random behavior pattern.

Alternatively, the step of a compressor determining an IP identifier behavior pattern according to characteristics of IP identifiers in the plurality of data packets at the front comprises:

before the IP identifier behavior pattern is determined, executing the following steps with respect to each data packet:

judging whether a packet flow of data packets to be compressed has already existed;

if the packet flow of the data packets does not exist, initializing a first counter and a second counter; and if the packet flow of the data packets exists, judging a relationship between a first IP identifier in a current data packet and a second IP identifier in a previous data packet:

(a) if the first IP identifier is greater than the second IP identifier, adding 1 to the first counter; judging whether the second counter is greater than 0, if the second counter is greater than 0, determining as a random behavior pattern, and a flow of determining the IP identifier behavior pattern ending; and if the second counter is not greater than 0, judging whether the first counter reaches the first threshold value, if the first counter reaches the first threshold value, determining as an incremental behavior pattern;

(b) if the first IP identifier is equal to the second IP identifier, adding 1 to the second counter, judging whether the first counter is greater than 0, if the first counter is greater than 0, determining as a random behavior pattern; and if the first counter is not greater than 0, judging whether the second counter reaches the second threshold value, if the second counter reaches the second threshold value, determining as a static behavior pattern; and (c) if the first IP identifier is less than the second IP identifier, determining as a random behavior pattern.

Alternatively, the method further comprises:

when judging that the packet flow of the data packets does not exist, initializing an IP identifier behavior flag as a first flag, after determining the IP identifier behavior pattern, setting the IP identifier behavior flag as a corresponding behavior flag after determining the IP identifier behavior pattern; when the compressor judges that the IP identifier behavior flag is the first flag, believing that a behavior pattern of the packet flow of the data packets is undetermined, and when the compressor judges that the IP identifier behavior flag is not the first flag, believing that the behavior pattern has been determined.

A robust header compressor comprises a behavior pattern determination unit and a data packet processing unit, wherein:

the behavior pattern determination unit is configured to: determine an IP identifier behavior pattern according to characteristics of IP identifiers in a plurality of data packets at the front; and the data packet processing unit is configured to: process the plurality of data packets at the front of a packet flow by using an Internet Protocol (IP) identifier random behavior pattern, and process subsequent data packets of the packet flow according to the determined IP identifier behavior pattern.

Alternatively, the behavior pattern determination unit is configured to determine an IP identifier behavior pattern according to characteristics of IP identifiers in a plurality of data packets at the front by means of:

if the IP identifiers in the data packets increase continuously, and a number of data packets with continuously increasing times reaches a first threshold value, determining as an IP identifier incremental behavior pattern;

if the IP identifiers in the data packets keep static continuously, and a number of data packets keeping static continuously reaches a second threshold value, determining as an IP identifier static behavior pattern; and otherwise, determining as an IP identifier random behavior pattern.

Alternatively, the behavior pattern determination unit comprises: a packet flow judgment module, an initialization module, a sequence identifier relationship judgment module, a counter control module, a behavior pattern determination module, a first counter, a second counter and a third counter, wherein:

the packet flow judgment module is configured to: judge whether a packet flow of data packets to be compressed has already existed;

the initialization module is configured to: when the packet flow of the data packets to be compressed doesn't exist, initialize the first counter, the second counter and the third counter;

the sequence identifier relationship judgment module is configured to: when the packet flow of the data packets exists, judge a relationship between a first IP identifier in a current data packet and a second IP identifier in a previous data packet;

the counter control module is configured to: when the first IP identifier is greater than the second IP identifier, control to add 1 to the first counter, clear the second counter, and proceed to step (d); when the first IP identifier is equal to the second IP identifier, control to add 1 to the second counter, and clear the first counter; and when the packet flow of the data packets to be compressed does not exist and each of the first counter and the second counter does not reach the threshold value, control to add 1 to the third counter;

the behavior pattern determination module is configured to: judge whether the first counter reaches the first threshold value, if the first counter reaches the first threshold value, determine as an incremental behavior pattern; and judge whether the second counter reaches the second threshold value, if the second counter reaches the second threshold value, determine as a static behavior pattern; and judge whether the third counter reaches a third threshold value, if the third counter reaches the third threshold value, determine as a random behavior pattern; and each of the first counter, the second counter and the third counter is configured to: perform counting.

Alternatively, the behavior pattern determination unit comprises: a packet flow judgment module, an initialization module, a sequence identifier relationship judgment module, a counter control module, a behavior pattern determination module, a first counter and a second counter, wherein:

the packet flow judgment module is configured to: judge whether a packet flow of data packets to be compressed has already existed;

the initialization module is configured to: when the packet flow of the data packets to be compressed doesn't exist, initialize the first counter and the second counter;

the sequence identifier relationship judgment module is configured to: when the packet flow of the data packets exists, judge a relationship between a first IP identifier in a current data packet and a second IP identifier in a previous data packet;

the counter control module is configured to: when the first IP identifier is greater than the second IP identifier, control to add 1 to the first counter; and when the first IP identifier is equal to the second IP identifier, control to add 1 to the second counter;

the behavior pattern determination module is configured to: when the first counter reaches the first threshold value and the second counter is 0, determine as an incremental behavior pattern; when the second counter reaches the second threshold value and the first counter is 0, determine as a static behavior pattern; and when 1 is added to the first counter and the second counter is greater than 0, or when 1 is added to the second counter and the first counter is greater than 0, or when the first IP identifier is less than the second IP identifier, determine as a random behavior pattern; and each of the first counter and the second counter is configured to: perform counting.

Alternatively, the initialization module is further configured to: when judging that the packet flow of the data packets does not exist, initialize an IP identifier behavior flag as a first flag, and set the IP identifier behavior flag as a corresponding behavior flag after determining the IP identifier behavior pattern; and the data packet processing unit is further configured to: when judging that the IP identifier behavior flag is the first flag, believe that a behavior pattern of the packet flow of the data packets is undetermined, and when judging that the IP identifier behavior flag is not the first flag, believe that the behavior pattern has been determined.

With the above robust header compression processing method and robust header compressor, firstly the IP identifier behavior pattern is determined according to the plurality of data packets at the front, and then compression processing is performed on the data packets according to the determined IP identifier behavior pattern, thus, appropriate compression strategies can be effectively adopted by identifying the behaviors of the IPID, which improves the efficiency of compression and decompression of robust header compression and the utilization rate of wireless link bandwidth.

PREFERRED EMBODIMENTS OF THE INVENTION

Since an allocation way by the generator of IP packet with respect to the IPID is fixed, after identifying behaviors of the IPID for a period of time, the behaviors of the IPID of the packet flow is determined, IPID identification is not required to be performed on the subsequent packet data packets, and the identified behaviors of the IPID can be directly used till the whole life cycle of the packet flow ends. Based on this, in the scheme of the robust header compression processing method and robust header compressor, firstly the IP identifier behavior pattern is determined according to the plurality of data packets at the front, and then compression processing is performed on the data packets according to the determined IP identifier behavior pattern, thus, appropriate compression strategies can be effectively adopted by identifying the behaviors of the IPID, which improves the efficiency of compression and decompression of robust header compression and the utilization rate of wireless link bandwidth.

The embodiments of the present document will be described in detail in combination with the accompanying drawings below. It should be noted that the embodiments in the present document and the characteristics in the embodiments can be combined with each other in the condition of no conflict. All these combinations are within the protection scope of the present document.

Embodiment 1

Figures 1, 2:
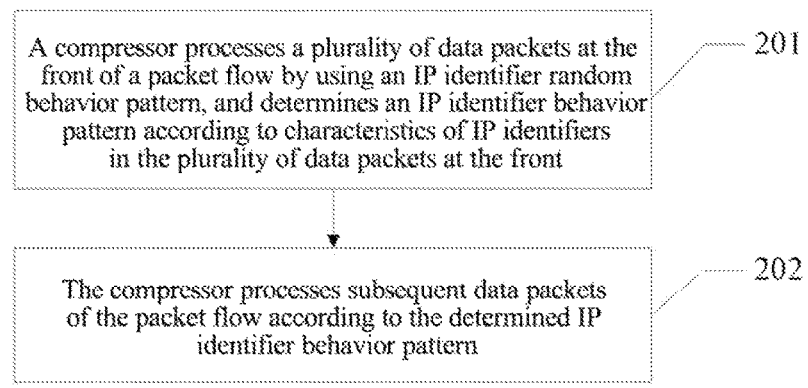
FIG. 1 is a schematic diagram of a location of an IPUD in an IPv4 header.
FIG. 2 is a schematic diagram of the robust header compression processing method according to the embodiment 1 of the present document.

As shown in FIG. 2, the robust header compression processing method in the embodiment 1 of the present document includes the following steps.

In step 201, a compressor processes a plurality of data packets at the front of a packet flow by using an IP identifier random behavior pattern, and determines an IP identifier behavior pattern according to characteristics of IP identifiers in the plurality of data packets at the front.

The step of determining an IP identifier behavior pattern according to characteristics of IP identifiers in the plurality of data packets at the front includes:

if a first condition that the IP identifiers in the data packets increase continuously and a number of data packets with continuously increasing times reaches a first threshold value is satisfied, determining as an IP identifier incremental behavior pattern;

if a second condition that the IP identifiers in the data packets keep static continuously and a number of data packets keeping static continuously reaches a second threshold value is satisfied, determining as an IP identifier static behavior pattern; and if neither the first condition nor the second condition is satisfied, determining as an IP identifier random behavior pattern.

In step 202, the compressor processes subsequent data packets of the packet flow according to the determined IP identifier behavior pattern.

The first threshold value and the second threshold value described in the embodiment of the present document cannot be less than 2, which can be alternatively set as an integer between 10 and 15, so as to insure the accuracy of determining as an incremental behavior pattern or a static behavior pattern.

Understandably, if it is determined as the incremental behavior pattern, the compressor adopts an Offset coding scheme to encode the original IPID information and then sends the encoded original IPID information to an opposite end, after a decompressor of the opposite end receives the encoded original IPID information, the decompressor firstly performs decompression to obtain an Offset of the IPID, and eventually restores the original value of the IPID in combined with the restored Offset.

If it is determined as the static behavior pattern, the compressor is not required to carry any IPID information, and the decompressor also can restore the original value of the IPID.

If it is determined as the random behavior pattern, the compressor is still required to carry the original IPID information each time, and the decompressor performs decompression and restoration.

Understandably, the compressor will inform the decompressor of corresponding behavior patterns of the IPID no matter before or after the determination of the behavior patterns of the IPID.

Embodiment 2

In the scheme, identification of a specific behavior of the IPID is implemented by setting an identifier and accumulating three counters.

An implementation scheme of IP identifier behavior identification and IP identifier compression involved in the present document will be further described in detail in combination with FIG. 3 and FIG. 4 below, and the followings steps are included.

In step S301, a compressor receives a packet data package to be compressed, and it is to proceed to step S302.

In step S302, it is judged whether the packet flow has already existed, if the packet flow does not exist, it is to proceed to step S303, and if the packet flow exists, it is to proceed to step S306.

In step S303, an IP identifier behavior flag (BehaviorFlag) and three counters, an IP identifier random behavior counter IP_rnd, an IP identifier static behavior counter Count_const and an IP identifier sequential behavior counter Count_seq, are initialized, and it is to proceed to step S304.

In step S304, 1 is added to Count_rnd, then it is to proceed to step S305.

In step S305, a random behavior is adopted to choose a compression strategy of the IPID, and it is to proceed to step S310.

Figure 4:
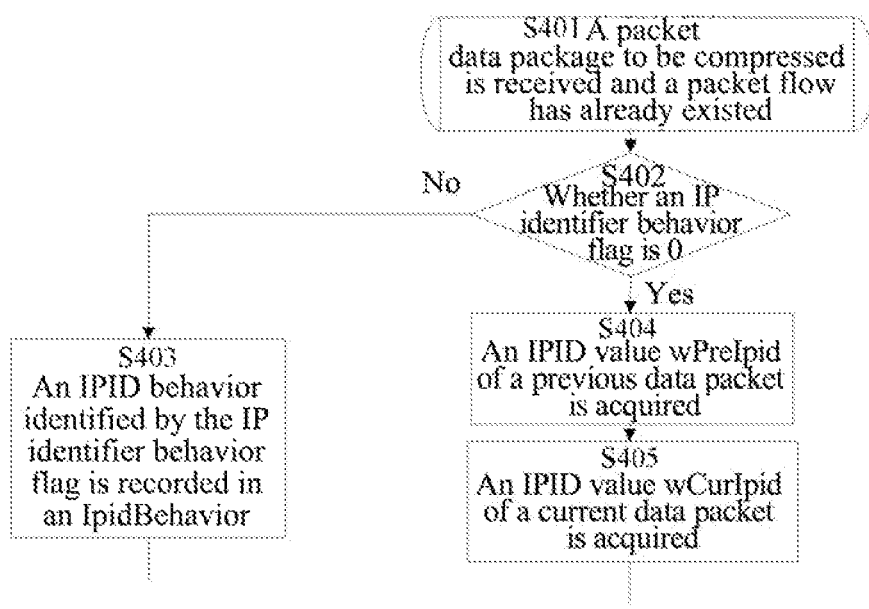

In step S306, a process of selecting the IP identifier behaviors is executed, a specific flow is shown in FIG. 4, and then it is to proceed to step S307.

In step S307, processing is performed according to an acquired IP identifier behavior, if the IP identifier behavior is a random behavior, it is to proceed to the step S305, if the IP identifier behavior is a static behavior, it is to proceed to step S308, and if the IP identifier behavior is sequentially incremental, it is to proceed to step S309.

In step S308, a static behavior is adopted to choose the compression strategy of the IPID, and it is to proceed to step S310.

In step S309, a sequential behavior is adopted to choose the compression strategy of the IPID, and it is to proceed to step S310.

In step S310, the flow of IP identifier behavior identification and IP identifier compression ends.

The implementation of IP identifier behavior identification involved in the embodiment of the present document will be further described in detail in combination with FIG. 4 below, and the followings steps are included.

In step S401, a compressor receives a packet package to be compressed and the packet flow has already existed, and it is to proceed to the step S402.

In step S402, it is judged whether the Behavior Flag is 0, if the Behavior Flag is not 0, it is to proceed to step S203, and if the Behavior Flag is 0, it is to proceed to step S404.

In step S403, a behavior of the IPID identified by the Behavior Flag is recorded into the IP identifier behavior Ipid Behavior, and it is to proceed to the step S420.

In step S404, an IPID value wPreIpid in a previous data packet is acquired, and it is to proceed to step S405.

In step S405, obtain an IPID value wCurIpid in a current packet is acquired, and it is to proceed to step S406.

In step S406, it is judged whether the wPreIpid is equal to the wCurIpid, if the wPreIpid is equal to the wCurIpid, it is to proceed to step S207, and if the wPreIpid is not equal to the wCurIpid, it is to proceed to step S211.

In step S407, 1 is added to Count_const, the counter Count_seq is cleared, and it is to proceed to step S408.

In step S408, it is judged whether the Count_const reaches a threshold value, if the Count_const reaches the threshold value, it is to proceed to step S409, and if the Count_const does not reach the threshold value, it is to proceed to step S412.

In step S409, the Behavior Flag is set as a static behavior, and it is to proceed to step S410.

In step S410, the static behavior is recorded into the IpidBehavior, and it is to proceed to step S420.

In step S411, it is judged whether wPreIpid is less than wCurIpid, if wPreIpid is less than wCurIpid, it is to proceed to step S416, and if wPreIpid is not less than wCurIpid, it is to proceed to step S412.

In step S412, 1 is added to Count_rnd, and it is to proceed to step S413.

In step S413, the random behavior is recorded into Ipid Behavior, and it is to proceed to step S414.

In step S414, it is judged whether the Count_rnd reaches a threshold value, if the Count_rnd reaches the threshold value, it is to proceed to step S415, and if the Count_rnd does not reach the threshold value, it is to proceed to the step S420.

In step S415, the Behavior Flag is set as a random behavior, and it is to proceed to step S420.

In step S416, 1 is added to Count_seq, the counter Count_const is cleared, and it is to proceed to step S417.

In step S417, it is judged whether the Count_seq reaches a threshold value, if the Count_seq reaches the threshold value, it is to proceed to step S418, and if the Count_seq does not reach the threshold value, it is to proceed to the step S412.

In step S418, the Behavior Flag is set as a sequentially incremental behavior, and it is to proceed to step S419.

In step S419, the sequentially incremental behavior is recorded into the Ipid Behavior, and it is to proceed to step S420.

In step S420, the IpidBehavior is returned, and the flow of IP identifier behavior identification ends.

Figure 3:
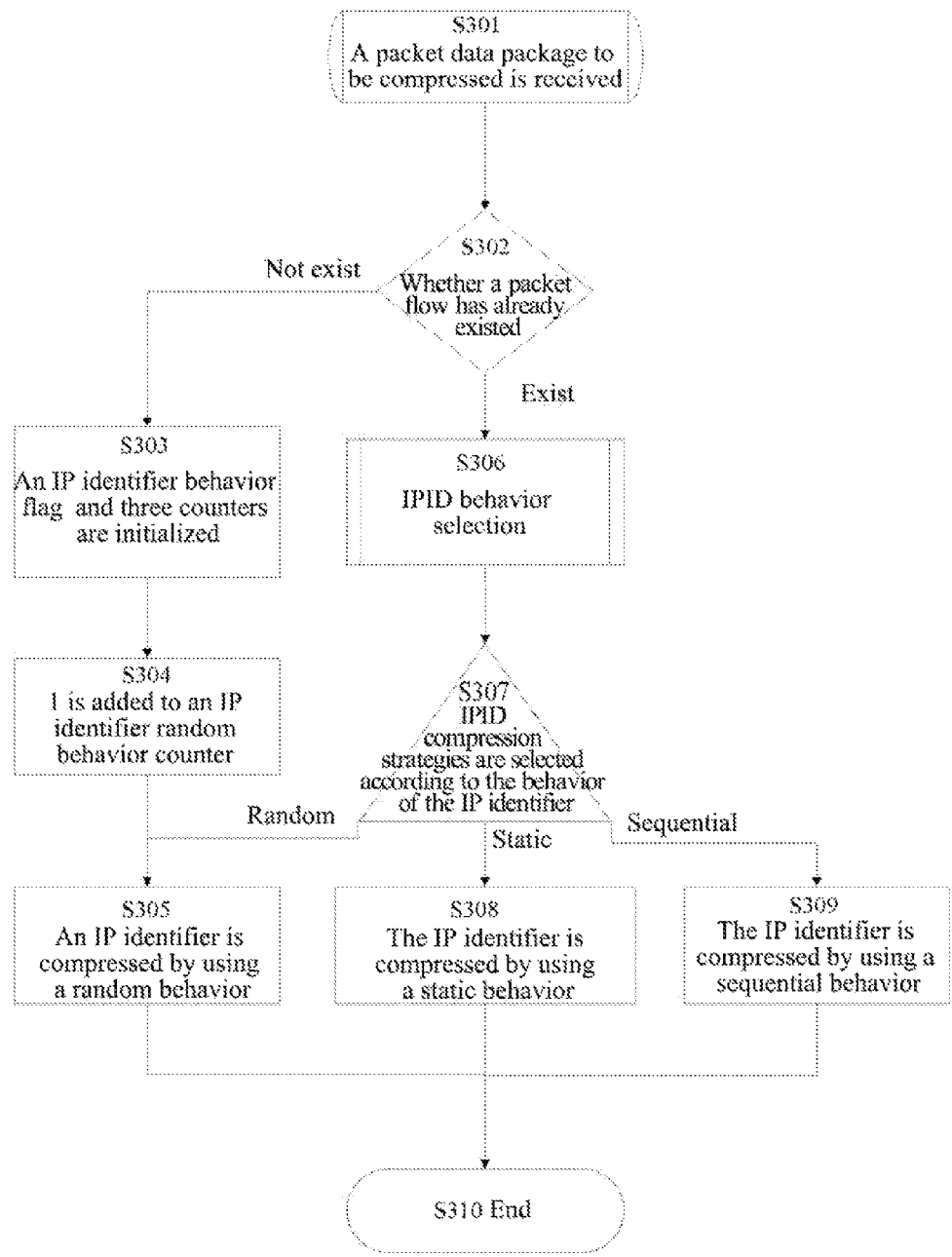
FIG. 3 and FIG. 4 are flow diagrams of the robust header compression processing method according to the embodiment 2.

According to the foregoing FIG. 3 and FIG. 4, it can be seen that:

1. when a packet to be compressed is received, if the packet belongs to a new packet flow, three counters, Count_rnd, Count_seq and Count_const, are established for the packet, an initial value is 0, a Behavior Flag is set as 0 which stands for an unknown IPID behavior, after the packet to be compressed is compressed, it carries an original IPID, that is, a random behavior pattern is adopted, and 1 is added to the Count_rnd.

2. when a packet to be compressed is received, if the packet flow has already existed and a Behavior Flag has been set, a compression strategy of the IPID will be selected according to the identified IPID behavior.

3. when a packet to be compressed is received, if the packet flow has already existed and a Behavior Flag is not set, an IPID in a current packet and an IPID in a previous packet are compared, if it is sequentially incremental, a value of the Count_const is cleared, 1 is added to the Count_seq; it is judged whether the Count_seq reaches a threshold value, if the Count_seq reaches the threshold value, the Behavior Flag is set as a sequential behavior; if it is a static value, 1 is added to the Count_const, a value of the Count_seq is cleared; it is judged whether the Count_const reaches a threshold value, if the Count_const reaches the threshold value, the Behavior Flag is set as a static behavior; if none of the Count_const and Count_seq reaches the threshold value, 1 is added to the Count_rnd, and it is judged whether the Count_rnd reaches a threshold value, if the Count_rnd reaches the threshold value, the Behavior Flag is set as a random behavior.

4. if the Behavior Flag is not set and none of the three counters reaches the threshold value, a random pattern is selected by default to perform the IPID compression.

In the above embodiment 2, when judging the relationship between the IP identifier (wCurIpid) in the current data packet and the IP identifier (wPreIpid) in the previous data packet, if it is shown as incremental, 1 is added to the first counter (Count_seq), the second counter (Count_const) is cleared, and it is to proceed to step (d); if it is shown as equal, 1 is added to the second counter (Count_const), the first counter (Count_seq) is cleared, and when it is determined that the first counter reaches the first threshold value, it is determined as an incremental behavior pattern; when the second counter reaches the second threshold value, it is determined as a static behavior pattern; when the packet flow of the data packets to be compressed does not exist and none of the first counter and the second counter reaches the threshold value, the third counter (Count_rnd) is controlled to be added with 1, it is judged whether the third counter reaches the third threshold value, if the third counter reaches the third threshold value, it is determined as a random behavior pattern.

In the above embodiment 2, when the relationship between the current and previous IP identifiers (wPreIpid) is shown as incremental or equal, 1 is added to a corresponding counter and the other counter is cleared, which represents that the flow processing has a symmetry, thereby avoiding the problem of inaccurate judgment caused by continuous counting of the corresponding first counter and second counter when the current and previous IP identifiers are not shown as continuously incremental or continuously equal.

In the above implementation steps, the threshold values of the counters, namely Count_rnd, Count_const and Count_Seq, are set according to practical situations, but the threshold value of the Count_rnd must be greater than the threshold value of the Count_const and the threshold value of the Count_Seq.

In order to simplify the above flow, an embodiment 3 is also provided below.

Embodiment 3

Figure 5:
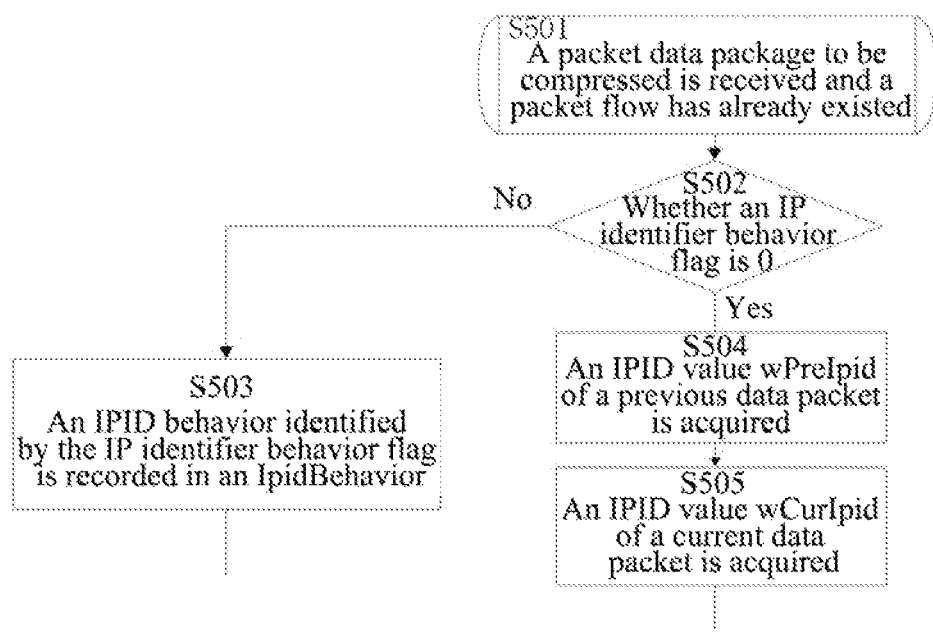
FIG. 5 is a flow diagram of a process of executing IP identifier behavior selection in the robust header compression processing method according to the embodiment 3 of the present document.

In this scheme, identification of a specific behavior of the IPID is implemented by setting an identifier and accumulating two counters. Compared with the foregoing embodiment 2, in the embodiment 3, the flows corresponding to FIG. 3 are basically the same, the difference only lies in the step S303, only the Behavior Flag and the 2 counters, Count_const and Count_Seq, are initialized, and the step S304 is not executed, the process of selecting IP identifier behaviors is executed, and as shown in FIG. 5, the following steps are specifically included:

In step S501, when a compressor receives a packet package to be compressed and the packet flow has existed, it is to proceed to step S502.

In step S502, it is judged whether a Behavior Flag is 0, if the Behavior Flag is not 0, it is to proceed to step S503, and if the Behavior Flag is 0, it is to proceed to step S504.

In step S503, a behavior of the IPID identified by the Behavior Flag is recorded into an IpidBehacior, and it is to proceed to step S520.

In step S504, an IPID value wPreIpid in a previous data packet is acquired, and it is to proceed to step S505.

In step S505, an IPID value wCurIpid in a current packet is acquired, and it is to proceed to step S506.

In step S506, it is judged whether the wPreIpid is equal to the wCurIpid, if the wPreIpid is equal to the wCurIpid, it is to proceed to step S507, and if the wPreIpid is not equal to the wCurIpid, it is to proceed to step S512.

In step S507, 1 is added to Count_const, and it is to proceed to step S508.

In step S508, it is judged whether the Count_seq is greater than 0 (that is, whether the Count_const increases continuously), if the Count_seq is greater than 0, it is to proceed to step S513, and if the Count_seq is not greater than 0, it is to proceed to step S509.

In step S509, it is judged whether the Count_const reaches a threshold value, if the Count_const reaches the threshold value, it is to proceed to step S510, and if the Count_const does not reach the threshold value, it is to proceed to step S514.

In step S510, the Behavior Flag is set as a static behavior, and it is to proceed to step S511.

In step S511, the static behavior is recorded into the IpidBehavior, and it is to proceed to step S520.

In step S512, it is judged whether the wPreIpid is less than the wCurIpid, if the wPreIpid is less than the wCurIpid, it is to proceed to step S514, and if the wPreIpid is not less than the wCurIpid, it is to proceed to step S513.

In step S513, the Behavior Flag is set as a random behavior, and it is to proceed to step S514.

In step S514, the random behavior is recorded into the IpidBehavior, and it is to proceed to step S520.

In step S515, 1 is added to Count_seq, and it is to proceed to step S515.

In step S516, it is judged whether the Count_const is greater than 0 (that is, whether the Count_seq is continuously incremental), if the Count_const is greater than 0, it is to proceed to step S513, and if the Count_const is not greater than 0, it is to proceed to step S517.

In step S517, it is judged whether the Count_seq reaches a threshold value, if the Count_seq reaches the threshold value, it is to proceed to S518, and if the Count_seq does not reach the threshold value, it is to proceed to step S514.

In step S518, the Behavior Flag is set as a sequentially incremental behavior, and it is to proceed to step S519.

In step S519, the sequentially incremental behavior is recorded into the IpidBehavior, and it is to proceed to step S520.

In step S520, the IpidBehavior is returned, and the flow of IP identifier behavior identification ends.

According to the above process, it can be known that:

before the IP identifier behavior pattern is determined, the following steps are executed with respect to each data packet:

judging whether the packet flow of data packets to be compressed has already existed;

if the packet flow of the data packets does not exist, initializing the first counter and the second counter; and if the packet flow of the data packets exists, judging the relationship between the first IP identifier in the current data packet and the second IP identifier in the previous data packet:

(a) if the first IP identifier is greater than the second IP identifier, adding 1 to the first counter; judging whether the second counter increases progressively last time, if the second counter increases progressively last time, determining as a random behavior pattern, and a flow of determining the IP identifier behavior pattern ending; and if the second counter does not increases progressively last time, judging whether the first counter reaches the first threshold value, if the first counter reaches the first threshold value, determining as an incremental behavior pattern;

(b) if the first IP identifier is equal to the second IP identifier, adding 1 to the second counter, judging whether the first counter increases progressively last time, if the first counter increases progressively last time, determining as a random behavior pattern; and if the first counter does not increases progressively last time, judging whether the second counter reaches the second threshold value, if the second counter reaches the second threshold value, determining as a static behavior pattern; and (c) if the first IP identifier is less than the second IP identifier, determining as a random behavior pattern.

Alternatively, in the above flow of IP identifier behavior identification, judgment processing can also be performed by storing a certain number of IPID values, but in consideration of an occupancy situation of system resources, the scheme described currently is the best, thus the implementation scheme is taken as an example to make descriptions.

With the above method, the defect that a failure of the compressor identifying the IPID behaviors automatically leads to a necessity of delivering the original value of the IPID to the compressor in the package is overcome, and a specific implementation method of identifying the IPID behaviors automatically is provided.

Figure 6:
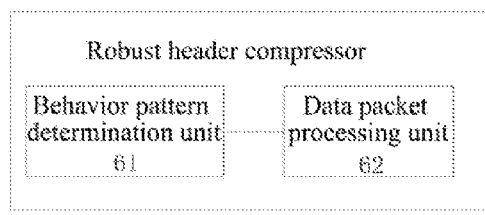
FIG. 6 is a schematic diagram of a module structure of the robust header compression processor according to the embodiment of the present document.

In order to implement the above method, the embodiment of the present document also provides a robust header compressor, and corresponding to the foregoing method embodiments 1 to 3, as shown in FIG. 6, the robust header compressor includes a behavior pattern determination unit 61 and a data packet processing unit 62, wherein:

the behavior pattern determination unit 61 is configured to: determine an IP identifier behavior pattern according to characteristics of IP identifiers in a plurality of data packets at the front; and the data packet processing unit 62 is configured to: process the plurality of data packets at the front of a packet flow by using an IP identifier random behavior pattern, and process subsequent data packets of the packet flow according to the determined IP identifier behavior pattern.

Alternatively, the behavior pattern determination unit 61 is configured to determine an IP identifier behavior pattern according to characteristics of IP identifiers in a plurality of data packets at the front in the following way:

if the IP identifiers in the data packets increase continuously, and a number of data packets with continuously increasing times reaches a first threshold value, determining as an IP identifier incremental behavior pattern;

if the IP identifiers in the data packets keep static continuously, and a number of data packets keeping static continuously reaches a second threshold value, determining as an IP identifier static behavior pattern; and otherwise, determining as an IP identifier random behavior pattern.

Figure 7:
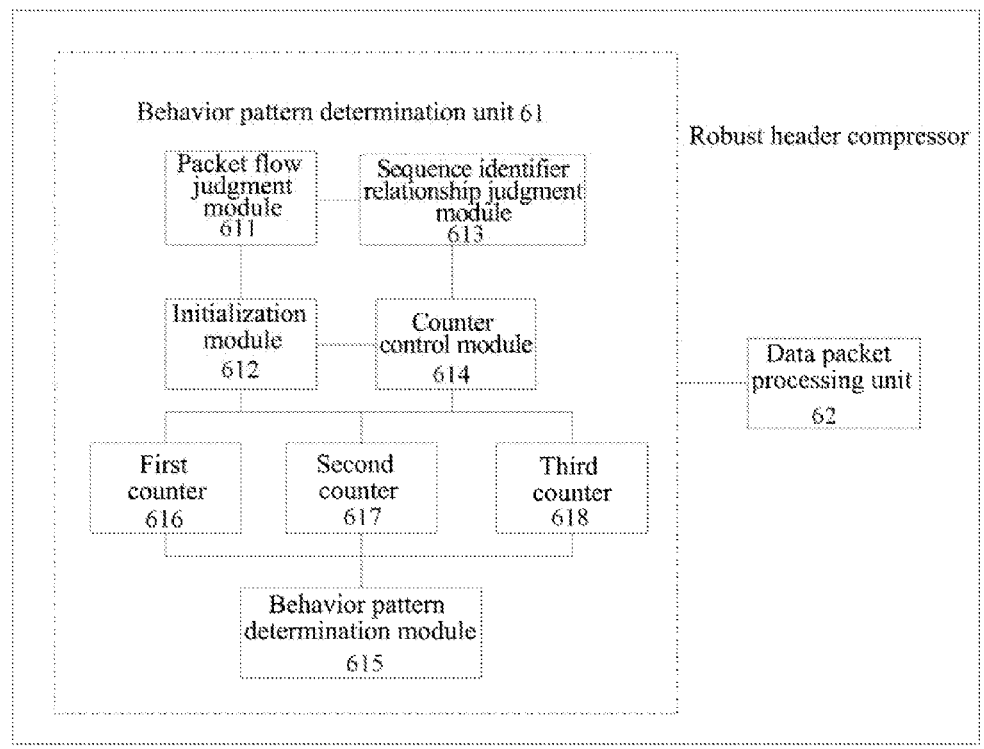
FIG. 7 is a schematic diagram of a module structure of the behavior pattern determination unit in FIG. 6.

Corresponding to the method embodiment 2, as shown in FIG. 7, the behavior pattern determination unit 61 includes: a packet flow judgment module 611, an initialization module 612, a sequence identifier relationship judgment module 613, a counter control module 614, a behavior pattern determination module 615, a first counter 615, a second counter 617 and a third counter 618, wherein:

the packet flow judgment module 611 is configured to: judge whether a packet flow of data packets to be compressed has already existed;

the initialization module 612 is configured to: when the packet flow of the data packets to be compressed doesn't exist, initialize the first counter 616, the second counter 617 and the third counter 618;

the sequence identifier relationship judgment module 613 is configured to: when the packet flow of the data packets exists, judge a relationship between a first IP identifier in a current data packet and a second IP identifier in a previous data packet;

the counter control module 614 is configured to: when the first IP identifier is greater than the second IP identifier, control to add 1 to the first counter 616, clear the second counter 617, and proceed to step (d); when the first IP identifier is equal to the second IP identifier, control to add 1 to the second counter 617, and clear the first counter 616; and when the packet flow of the data packets to be compressed does not exist and both the first counter and the second counter do not reach the threshold value, control to add 1 to the third counter 618;

the behavior pattern determination module 615 is configured to: judge whether the first counter 616 reaches the first threshold value, if the first counter 616 reaches the first threshold value, determine as an incremental behavior pattern; and judge whether the second counter 617 reaches the second threshold value, if the second counter 617 reaches the second threshold value, determine as a static behavior pattern; and judge whether the third counter 618 reaches a third threshold value, if the third counter 618 reaches the third threshold value, determine as a random behavior pattern; and each of the first counter 616, the second counter 617 and the third counter 618 is configured to: perform counting.

Figure 8:
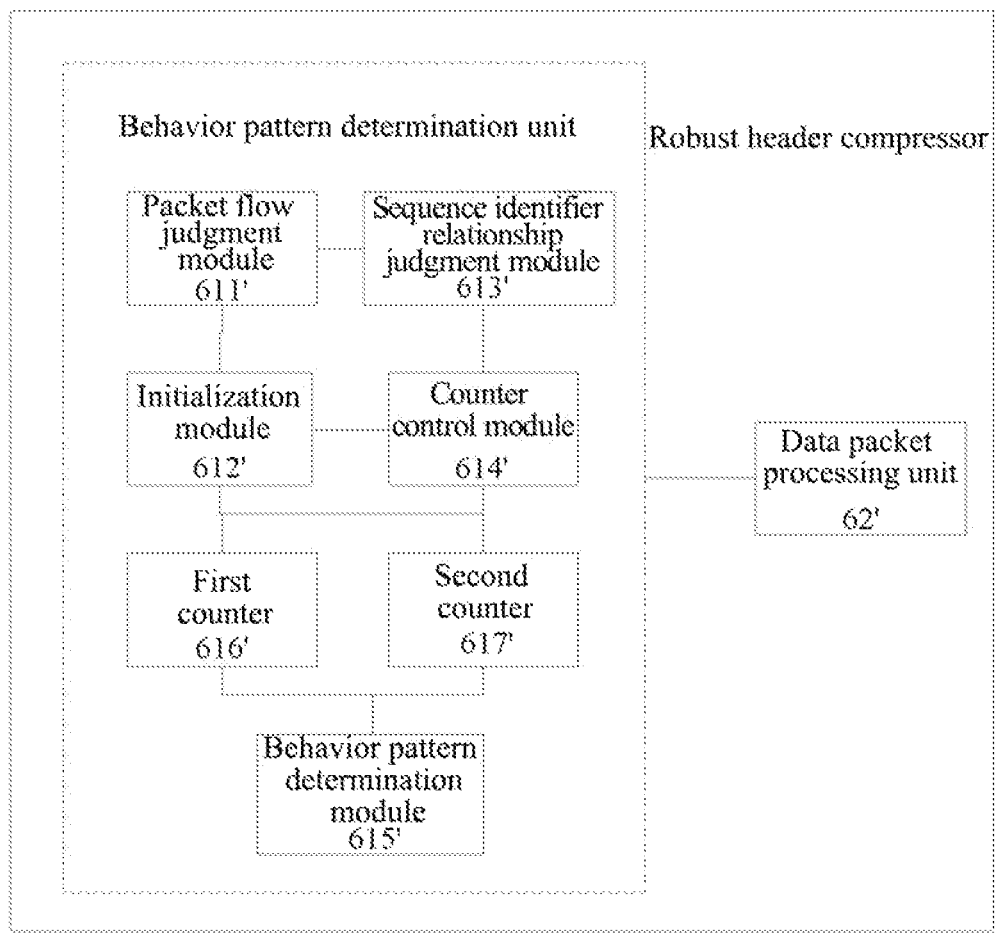
FIG. 8 is another schematic diagram of a module structure of the behavior pattern determination unit in FIG. 6.

Corresponding to the method embodiment 3, as shown in the FIG. 8, the behavior pattern determination unit 61 includes: a packet flow judgment module 611', an initialization module 612', a sequence identifier relationship judgment module 613', a counter control module 614', a behavior pattern determination module 615', a first counter 616' and a second counter 617', wherein:

the packet flow judgment module 611' is configured to: judge whether a packet flow of data packets to be compressed has already existed;

the initialization module 612' is configured to: when the packet flow of the data packets to be compressed doesn't exist, initialize the first counter 616' and the second counter 617';

the sequence identifier relationship judgment module 613' is configured to: when the packet flow of the data packets exists, judge a relationship between a first IP identifier in a current data packet and a second IP identifier in a previous data packet;

the counter control module 614' is configured to: when the first IP identifier is greater than the second IP identifier, control to add 1 to the first counter 616; and when the first IP identifier is equal to the second IP identifier, control to add 1 to the second counter 617'; and the behavior pattern determination module 615' is configured to: when the first counter 616' reaches the first threshold value and the second counter 617' is 0, determine as an incremental behavior pattern; when the second counter 617' reaches the second threshold value and the first counter 616' is 0, determine as a static behavior pattern; and when 1 is added to the first counter 616' and the second counter 617' is greater than 0, or when 1 is added to the second counter 617' and the first counter 616' is greater than 0, or when the first IP identifier is less than the second IP identifier, determine as a random behavior pattern.

Alternatively, the initialization module 612' is further configured to: when judging that the packet flow of the data packets does not exist, initialize an IP identifier behavior flag as a first flag, and set the IP identifier behavior flag as a corresponding behavior flag after determining the IP identifier behavior pattern; and the data packet processing unit 62' is further configured to: when judging that the IP identifier behavior flag is the first flag, believe that a behavior pattern of the packet flow of the data packets is undetermined, and when judging that the IP identifier behavior flag is not the first flag, believe that the behavior pattern has been determined.

The present document has the following advantages:

the behaviors of the IPID are identified rapidly to provide a guarantee for selecting compression strategies of the IPID;

the efficiency of compression and decompression is enhanced;

it is not required to store multiple IPID values, which saves system resources; and the smallest compressed packet is only of 1 to 2 bytes, but the IPID field occupies 2 bytes, if the original value of the IPID is carried in the compressed packet by using a random pattern, the space of the compressed packet is doubled, thus an accurate IPID compression will enhance the utilization rate of wireless bandwidth.

The above description is only for the preferred embodiments of the present document, which is not used to limit the present document. The present document can have various modifications and changes for the skilled in the art. All the modifications, equivalent substitutions, and improvements, etc. made within the spirit and principle of the present document shall fall into the protection scope of the present document.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above embodiments also can be implemented by using one or multiple integrated circuits. Correspondingly, each module/unit in the above embodiments can be implemented in a form of hardware, and also can be implemented in a form of software function module. The present document is not limited to any combination of hardware and software in a specific form.

INDUSTRIAL APPLICABILITY

With the above robust header compression processing method and robust header compressor, firstly the IP identifier behavior pattern is determined according to the plurality of data packets at the front, and then compression processing is performed on the data packets according to the determined IP identifier behavior pattern, thus, appropriate compression strategies can be effectively adopted by identifying the behaviors of the IPID, which improves the efficiency of compression and decompression of robust header compression and the utilization rate of wireless link bandwidth. Therefore, the present document has a strong industrial applicability.

What is claimed is:

1. A robust header compression processing method, comprising:

a compressor processing a plurality of data packets at a front of a packet flow by using an Internet Protocol (IP) identifier random behavior pattern, and determining an IP identifier behavior pattern according to characteristics of IP identifiers in the plurality of data packets at the front of the packet flow;

the compressor processing subsequent data packets of the packet flow according to the determined IP identifier behavior pattern;

when judging that the packet flow of data packets to be compressed does not exist, initializing an IP identifier behavior flag as a first flag, after determining the IP identifier behavior pattern, setting the IP identifier behavior flag as a corresponding behavior flag after determining the IP identifier behavior pattern; and when the compressor judges that the IP identifier behavior flag is the first flag, believing that a behavior pattern of the packet flow of the data packets is undetermined, and when the compressor judges that the IP identifier behavior flag is not the first flag, believing that the behavior pattern has been determined.

2. The robust header compression processing method according to claim 1, wherein, the compressor determining an IP identifier behavior pattern according to characteristics of IP identifiers in the plurality of data packets at the front of the packet flow comprises:
when the IP identifiers in the data packets increase continuously, and a number of data packets with continuously increasing times reaches a first threshold value, determining as an IP identifier incremental behavior pattern; and
when the IP identifiers in the data packets keep static continuously, and a number of data packets keeping static continuously reaches a second threshold value, determining as an IP identifier static behavior pattern; and
otherwise, determining as an IP identifier random behavior pattern.

3. The robust header compression processing method according to claim 1, wherein, the compressor determining an IP identifier behavior pattern according to characteristics of IP identifiers in the plurality of data packets at the front of the packet flow comprises:
before the IP identifier behavior pattern is determined, executing following steps with respect to each data packet:
(a) judging whether a packet flow of data packets to be compressed has already existed;
(b) when the packet flow of the data packets does not exist, initializing a first counter, a second counter and a third counter, and adding 1 to the third counter; and when the packet flow of the data packets exists, executing step (c);
(c) judging a relationship between a first IP identifier in a current data packet and a second IP identifier in a previous data packet; when the first IP identifier is greater than the second IP identifier, adding 1 to the first counter, clearing the second counter, and proceeding to step (d); when the first IP identifier is equal to the second IP identifier, adding 1 to the second counter, clearing the first counter, and proceeding to step (e); and otherwise, executing step (f);
(d) judging whether the first counter reaches the first threshold value, when the first counter reaches the first threshold value, determining as an incremental behavior pattern; and when the first counter does not reach the first threshold value, executing step (f);
(e) judging whether the second counter reaches the second threshold value, when the second counter reaches the second threshold value, determining as a static behavior pattern; and when the second counter does not reach the second threshold value, executing step (f); and
(f) adding 1 to the third counter, and judging whether the third counter reaches the third threshold, when the third counter reaches the third threshold, determining as a random behavior pattern.

4. The robust header compression processing method according to claim 1, wherein, the compressor determining an IP identifier behavior pattern according to characteristics of IP identifiers in the plurality of data packets at the front of the packet flow comprises:
before the IP identifier behavior pattern is determined, executing following steps with respect to each data packet:

judging whether a packet flow of data packets to be compressed has already existed;
when the packet flow of the data packets does not exist, initializing a first counter and a second counter; and
when the packet flow of the data packets exists, judging a relationship between a first IP identifier in a current data packet and a second IP identifier in a previous data packet:
(a) when the first IP identifier is greater than the second IP identifier, adding 1 to the first counter; judging whether the second counter is greater than 0, when the second counter is greater than 0, determining as a random behavior pattern, and a flow of determining the IP identifier behavior pattern ending; and if the second counter is not greater than 0, judging whether the first counter reaches the first threshold value, when the first counter reaches the first threshold value, determining as an incremental behavior pattern;
(b) when the first IP identifier is equal to the second IP identifier, adding 1 to the second counter, judging whether the first counter is greater than 0, when the first counter is greater than 0, determining as a random behavior pattern; and when the first counter is not greater than 0, judging whether the second counter reaches the second threshold value, when the second counter reaches the second threshold value, determining as a static behavior pattern; and
(c) when the first IP identifier is less than the second IP identifier, determining as a random behavior pattern.

5. A robust header compressor, comprising a behavior pattern determination unit and a data packet processing unit, wherein:
the behavior pattern determination unit is configured to: determine an IP identifier behavior pattern according to characteristics of IP identifiers in a plurality of data packets at a front of a packet flow;
the data packet processing unit is configured to: process the plurality of data packets at the front of the packet flow by using an Internet Protocol (IP) identifier random behavior pattern, and process subsequent data packets of the packet flow according to the determined IP identifier behavior pattern;
the behavior pattern determination unit further includes an initialization module which is configured to: when judging that the packet flow of data packets does not exist, initialize an IP identifier behavior flag as a first flag, and set the IP identifier behavior flag as a corresponding behavior flag after determining the IP identifier behavior pattern; and
the data packet processing unit is further configured to: when judging that the IP identifier behavior flag is the first flag, believe that a behavior pattern of the packet flow of the data packets is undetermined, and when judging that the IP identifier behavior flag is not the first flag, believe that the behavior pattern has been determined.

6. The robust header compressor according to claim 5, wherein, the behavior pattern determination unit is configured to determine an IP identifier behavior pattern according to characteristics of IP identifiers in a plurality of data packets at the front of the packet flow by following way:
when the IP identifiers in the data packets increase continuously, and a number of data packets with continuously increasing times reaches a first threshold value, determining as an IP identifier incremental behavior pattern;

when the IP identifiers in the data packets keep static continuously, and a number of data packets keeping static continuously reaches a second threshold value, determining as an IP identifier static behavior pattern; and otherwise, determining as an IP identifier random behavior pattern.

7. The robust header compressor according to claim 5, wherein, the behavior pattern determination unit comprises: a packet flow judgment module, an initialization module, a sequence identifier relationship judgment module, a counter control module, a behavior pattern determination module, a first counter, a second counter and a third counter, wherein:

the packet flow judgment module is configured to: judge whether a packet flow of data packets to be compressed has already existed;

the initialization module is configured to: when the packet flow of the data packets to be compressed doesn't exist, initialize the first counter, the second counter and the third counter;

the sequence identifier relationship judgment module is configured to: when the packet flow of the data packets exists, judge a relationship between a first IP identifier in a current data packet and a second IP identifier in a previous data packet;

the counter control module is configured to: when the first IP identifier is greater than the second IP identifier, control to add 1 to the first counter, clear the second counter, and proceed to step (d); when the first IP identifier is equal to the second IP identifier, control to add 1 to the second counter, and clear the first counter; and when the packet flow of the data packets to be compressed does not exist and both the first counter and the second counter do not reach the threshold value, control to add 1 to the third counter;

the behavior pattern determination module is configured to: judge whether the first counter reaches the first threshold value, when the first counter reaches the first threshold value, determine as an incremental behavior pattern; and judge whether the second counter reaches the second threshold value, when the second counter reaches the second threshold value, determine as a static behavior pattern; and judge whether the third counter reaches a third threshold value, when the third counter reaches the third threshold value, determine as a random behavior pattern; and all the first counter, the second counter and the third counter are configured to: perform counting.

8. The robust header compressor according to claim 5, wherein, the behavior pattern determination unit comprises: a packet flow judgment module, an initialization module, a sequence identifier relationship judgment module, a counter control module, a behavior pattern determination module, a first counter and a second counter, wherein:

the packet flow judgment module is configured to: judge whether a packet flow of data packets to be compressed has already existed;

the initialization module is configured to: when the packet flow of the data packets to be compressed doesn't exist, initialize the first counter and the second counter;

the sequence identifier relationship judgment module is configured to: when the packet flow of the data packets exists, judge a relationship between a first IP identifier in a current data packet and a second IP identifier in a previous data packet;

the counter control module is configured to: when the first IP identifier is greater than the second IP identifier, control to add 1 to the first counter; and when the first IP identifier is equal to the second IP identifier, control to add 1 to the second counter;

the behavior pattern determination module is configured to: when the first counter reaches the first threshold value and the second counter is 0, determine as an incremental behavior pattern; when the second counter reaches the second threshold value and the first counter is 0, determine as a static behavior pattern; and when 1 is added to the first counter and the second counter is greater than 0, or when 1 is added to the second counter and the first counter is greater than 0, or when the first IP identifier is less than the second IP identifier, determine as a random behavior pattern; and both the first counter and the second counter are configured to: perform counting.

* * * * *